United States Patent
Migeotte

[15] 3,688,235
[45] Aug. 29, 1972

[54] APPARATUS FOR DETECTING THE ANGULAR DEFLECTION IMPARTED TO A BEAM PASSING THROUGH A TRANSPARENT SHEET

[72] Inventor: Paul Migeotte, Montigny-le-Tilleul, Belgium

[73] Assignee: Institut National du Verre A.S.B.L., Charleroi, Belgium

[22] Filed: Jan. 15, 1970

[21] Appl. No.: 3,218

Related U.S. Application Data

[63] Continuation of Ser. No. 538,864, March 30, 1966, abandoned.

[30] Foreign Application Priority Data

March 31, 1965 Belgium..................48,289

[52] U.S. Cl...........356/239, 250/219 DF, 250/237 R
[51] Int. Cl..............................G01n 21/32
[58] Field of Search...............356/120, 152–154, 356/199, 200, 201, 206, 239, 100; 250/237 R

[56] References Cited

UNITED STATES PATENTS 3,361,025  1/1968  Gaffard..................356/200 X
3,027,461  3/1962  Kavanagh..............356/206 X
3,069,964  12/1962  Simon....................356/200 X
3,069,967  12/1962  White et al..............356/100
2,889,737  6/1959  Griss et al..............356/200 X
3,338,130  8/1967  Gaffard..................356/200 X
2,873,644  2/1959  Kremen et al..........356/206 X

FOREIGN PATENTS OR APPLICATIONS 906,947  9/1962  Great Britain.................88/14

Primary Examiner—Ronald L. Wibert
Assistant Examiner—Orville B. Chew, II
Attorney—Spencer & Kaye

[57] ABSTRACT

A method and apparatus for determining the angular deflection imparted by a sheet of transparent material to a light beam passing therethrough by projecting at least one light beam through such sheet and detecting at least one portion of the beam at a location whose relation to the path which would be followed by the beam if no sheet were present is such that the light level of such portion varies as a function of the angular beam deflection, this detection being effectuated by a light sensitive element and a screen being disposed in the path of the light beam for giving it at least one well-defined boundary.

14 Claims, 6 Drawing Figures

Patented Aug. 29, 1972

3,688,235

INVENTOR
Paul Migeotte

BY *Spencer & Kay*

ATTORNEYS

APPARATUS FOR DETECTING THE ANGULAR DEFLECTION IMPARTED TO A BEAM PASSING THROUGH A TRANSPARENT SHEET

CROSS-REFERENCE TO RELATED APPLICATION

The present application is a continuation of copending application Ser. No. 538,864, filed Mar. 30, 1966 now abandoned.

The present invention relates to the field of optical testing, and particularly to a method and apparatus for determining the degree of angular deflection imparted to a light beam passing through a sheet of transparent material.

The present invention is particularly intended to be used for determining whether, and to what degree, the two opposed faces of a sheet of transparent material are non-parallel at one or more locations across the sheet. Such non-parallelism, or angularity, between opposed faces of the sheet can be measured in any plane normal to the median plane of the sheet.

It has been found that when a light beam passes through a sheet having a certain degree of angularity, the beam will undergo a certain amount of angular deflection. In certain situations, this angularity might be due to a serious flaw in the sheet which causes objects viewed therethrough to be distorted. Such distortion is sometimes created by defects other than flaws. For example, certain chemical or physical heterogeneities in glass compositions may create local lens effects in the glass sheets formed from such compositions. The present invention also permits defects of this type to be detected.

Various methods have already been proposed for detecting or measuring angularity in a transparent sheet. These prior techniques are generally either mechanical or optical in nature.

The mechanical techniques are generally carried out with the aid of complicated mechanical devices. They invariably lack precision and are inherently incapable of determining other than geometrical characteristics of the sheet, even though the sheet may possess other defects which produce optical distortions similar to those due to angularity.

The optical techniques previously proposed rely on reflection, interference, or transmission properties of the transparent material. The methods based on reflection or interference properties require some type of evaluation of reflected light beams having an intensity which is very low in relation to the incident light. It has thus far not been possible to obtain accurate results with these methods. The previously proposed techniques based on light transmission are carried out by viewing a uniform pattern through the transparent sheet and by making a qualitative subjective judgement with respect to the appearance of the pattern, the results of this judgement depending on the relative position and skill of the observer.

It is a primary object of the present invention to overcome these drawbacks.

Another object of the present invention is to provide improved precision in the measurement of angularity and optically similar defects in a sheet of transparent material.

Still another object of the present invention is to simplify the determination of angularity, and optically similar defects, in a sheet of transparent material.

Yet another object of the present invention is to provide an improved method for measuring such defects.

A still further object of the present invention is to provide novel apparatus for carrying out the above method.

These and other objects of the present invention are achieved by a method of determining the angular deflection imparted by a sheet of transparent material to a light beam passing therethrough, which method includes the steps of projecting at least one light beam through the sheet, and detecting at least one portion of the beam at a location whose relation to the path which would be followed by such light beam if no transparent sheet were present is such that the flux level of that portion varies as a function of the degree of angular deflection of the beam.

The present invention includes also apparatus for performing the above-described method. Thus the invention includes any apparatus comprising means including a light source for projecting at least one beam of light, means for holding a sheet of transparent material in the path of such beam, and light detector means arranged for detecting angular beam deflections produced by such sheet. This latter device includes a light measuring detector located, or capable of being located, in the path of light transmitted through such sheet from a said light source so that the quantity of light influencing the light detector is dependent on the extent of such angular displacement, and means for registering or recording the existence and/or extent of angular beam deflection indicated by the detector response. One of the advantages of the method according to the present invention is that it does not depend on any subjective determinations whatsoever by the operator.

It may thus be seen that the present invention is based upon a principle which is completely different from those of the prior techniques for determining the presence of angularity in a sheet of transparent material.

In applying the present invention to the measurement of angularity, it is first assumed that the transparent sheet to be examined is free from internal compositional heterogeneities which would cause a light beam incident in a direction normal to one face of the sheet to be angularly deflected even if no angularity existed between the opposing surfaces of the sheet. If a light beam is projected through a sheet which is free of such heterogeneities, the relationship between the incident and emergent beam paths will be dependent both on the orientation of the sheet in relation to the axis of the incident beam (i.e., the angle of incidence) and the angularity of the sheet at the point through which the beam passes. If the angularity in all directions is substantially zero, the axis of the emergent beam will be in alignment with that of the incident beam, provided that the angle of incidence is 90°. If the angle of incidence is other than 90°, the axis of the emergent beam will be laterally displaced with respect to that of the incident beam, but the axes will nevertheless be parallel regardless of the actual value of the angle of incidence.

In contrast thereto, if a light beam is projected through a transparent sheet possessing some degree of angularity at the point through which the beam passes, the axis of the emergent beam will always be angularly deflected with respect to that of the incident beam.

The present invention takes advantage of these phenomena by locating a light detector in such a way that purely lateral displacements of the emergent beam, not accompanied by any angular deflection, do not substantially influence the readings produced by the detector.

Additional objects and advantages of the present invention will become apparent upon consideration of the following description when taken in conjunction with the accompanying drawings in which:

FIG. 2b shows a modified form of another element of the embodiment of FIG. 1 for use with the element of FIG. 2a.

FIG. 3a shows another modified form of the element of FIG. 2a.

Figure 1:
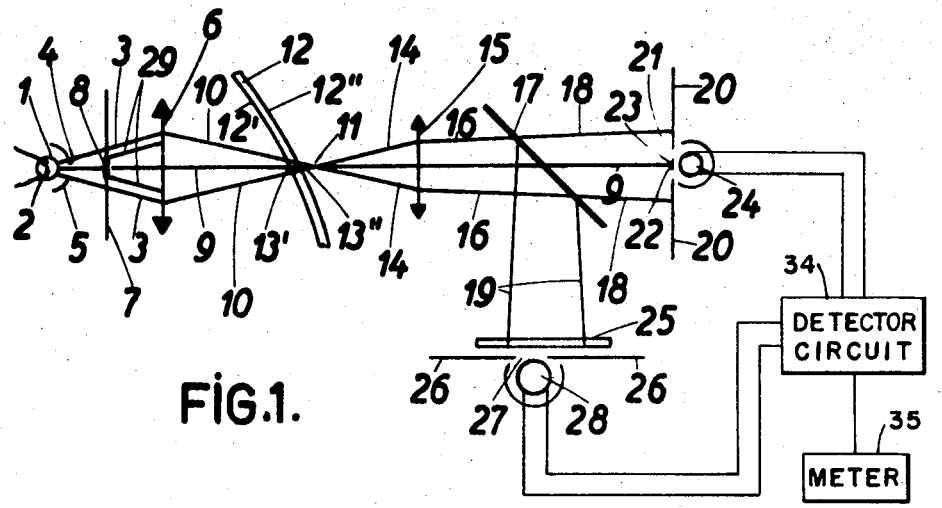
FIG. 1 is a diagrammatic side view of a preferred embodiment of an arrangement for carrying out the present invention.

Referring now to FIG. 1, there is shown a system including a light source 1 provided with an incandescent filament 2 constituting a point source of light. This source projects a diverging conical light beam 3 the value of whose apical angle is determined by the dimensions of an opening 4 in a mask 5. A converging lens 6 is located in the path of the light beam, and a disc 8 is located between lens 6 and source 1 on the focal plane 7 of the lens. Disc 8 is preferably opaque.

The lens 6 converges that portion of the beam which bypasses the disc 8 and this beam portion forms a beam 10 which converges to a point 11 on the optical axis 9 of the system. Just ahead of the point 11, a sheet 12 to be tested is positioned so that the light beam 10 passes through the sheet. The sheet is arranged so that the faces 12' and 12" thereof intersect the axis 9 at the points 13' and 13", respectively.

Beyond the point 11, the light beam diverges to form a cone 14 which encounters a converging lens 15. The light beam 16 emerging from the lens 15 then encounters a semi-transparent mirror 17 which is inclined at an angle of 45° with respect to axis 9. A portion of the beam 16 passes through the mirror 17 and forms a beam 18, the remainder of the beam being reflected to form a second beam 19.

In the path of beam 18 is disposed a detection device comprising an opaque screen 20 having an opaque central circular area 22 surrounded by an annular opening 21 for the passage of light. The center 23 of the area 22 is preferably disposed on the optical axis 9 of the system. The screen 20 is disposed on the rear focal plane of the lens 15. Behind the center of the screen 20 is disposed a photoelectrical cell 24 which is arranged to receive the portion of beam 18 which passes through opening 21.

In the path of the reflected beam 19 is disposed a light diffusing ground glass screen 25 behind which is arranged a light detection device including an opaque screen 26 having an opening 27, and a photoelectric cell 28 arranged for receiving the light passing through opening 27.

Photoelectric cells 24 and 28 are connected into a suitable electrical circuit 34 connected to a meter 35 for providing an indication of the occurrence of an angular deflection of the light beam passing through sheet 12. Many different types of electrical systems capable of producing such an indication will become readily apparent to those skilled in the art once they have been apprised of the desired result.

By way of example only, the photoelectric cells 24 and 28 may each be connected into one arm of a Wheatstone bridge constituting circuit 34 and arranged to produce an output signal which is independent of variations in the intensity of the beam emitted by the source 1 or of the transparency of the sheet 12 in the region traversed by the light beam and which is therefore only dependent on the degree of angular beam deflection. This bridge circuit is preferably provided with an indicating and/or recording microammeter 35 for providing indications of unbalances in the bridge circuit, or with an electrical resistance across which the voltage may be measured and/or recorded for the same purpose. In order to permit the bridge circuit to be properly balanced for the case where the light beam does not undergo an angular deflection when passing through sheet 12, means may be provided for varying the size of the opening 27 in screen 26. The output signal from the electric circuit, which represents a measure of angularity, or of other factors producing a similar optical effect, can readily be converted into a visual or audible record, or a visual signal such as the deflection of a needle on a scale calibrated in terms of angularity.

Figure 4:
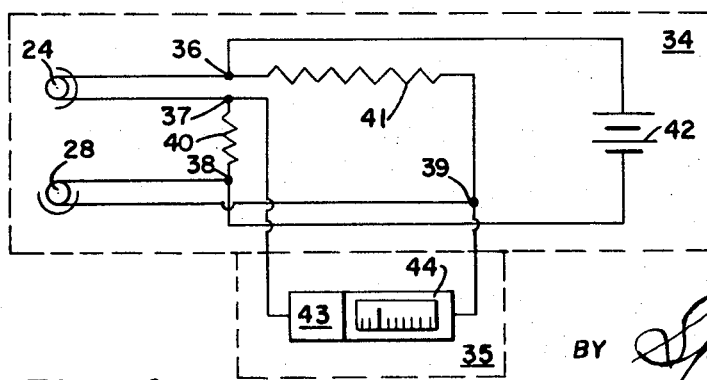
FIG. 4 is a schematic diagram of an electric bridge circuit for comparing the signals given by the detecting device of FIG. 1.

FIG. 4 shows in a detailed but schematic manner the electrical circuit 34 connected to the photoelectric cells 24 and 28 already shown in FIG. 1, and to a meter 35 equally shown in FIG. 1.

Photoelectric cells 24 and 28 are respectively mounted between points 36, 37 and 36, 39, these circuits constituting two arms of a Wheatstone bridge, generally indicated by 34. Resistors 40 and 41 are respectively inserted between points 37, 38 and 36, 39, these circuits constituting the two other arms of the bridge. Between points 36 and 38 is equally inserted a source of low D.C. current 42 and between points 37 and 39 is inserted a meter 35, comprising a current amplifier 43 and an ammeter 44 which is graduated in amperes or preferably directly in seconds, eventually in minutes of angularity.

The values of the resistors 40 and 41, the source of D.C. voltage 42, and amplifier 43 are choosen with respect to the characteristics of both photocells 24 and 28 and of the magnitude of the angularity to be measured, or with respect to the sensitivity of ammeter 43, as will be soon recognized by a person skilled in the art.

As soon as appears a difference in voltage signals, as a result of an even weak angularity, the bridge 34 is in desequilibrium and influences amplifier 43 which in turn influences ammeter 44. As already stated, the last can be graduated in terms of minutes or seconds of angularity.

It should be appreciated that the illustration of FIG. 1 is purely diagrammatic and that the beam paths are not shown with accuracy, but are merely suggested.

Due to the fact that sheet 12 is inclined with respect to the optical axis of the incident ray beam 10, the axis of the emergent ray beam 14 will in fact be slightly displaced with respect to the axis of the incident ray beam 10. This displacement however is very small and the incident and emergent ray beams are always parallel, provided that there is no angularity at the zone of the sheet traversed by the light. Consequently, in the drawing the axes of the incident and emergent light beams have been shown as in alignment, giving a common axis 9.

The inner boundary of the light beam of annular cross section extending from the opaque disc 8 to the lens 6 is indicated by lines 29. In actual fact the rays at this inner boundary will not be quite parallel to the rays at the outer boundary of the annular beam because all rays emanate from a common point 2, but the divergency is not shown on the drawing. The continuation of such inner boundary rays extends beyond the lens 6 but has not been indicated. The opaque screens 20 and 26 may be regarded as forming parts of enclosures housing the respective photocells so that light can reach these cells only through openings 21 and 27, respectively.

A sharp image of the disc 8 is focussed on the central area 22 of the screen 20 provided that the faces 12', 12'' of the sheet are parallel in the region traversed by the light and, due to the design of the optical system, there will be no displacement, or at least no significant displacement, of this image if the inclination of sheet 12 with respect to the optical axis 9 is varied, notwithstanding the fact that such variation of the sheet inclination alters the lengths of the paths through the material of the sheet which have to be traversed by the rays. So long as the image of disc 8 is entirely on the central screen area 22, the light flux impinging on cell 24 is a maximum.

If now the sheet 12 is displaced in the direction of arrows 56 by any suitable moving and holding means 55 so that another zone of the sheet is exposed to the light, and if this next irradiated zone possesses angularity, the light rays emergent from the sheet 12 and constituting beam 14 will be angularly deflected and, in consequence, the image of disc 8 will be displaced so that a portion of it intersects annular opening 21, thereby causing the total light flux reaching cell 24 to decrease to an extent which depends upon the degree of ray deflection. Consequently, the extent to which the light flux on cell 24 is reduced is a measure of the degree of angularity of the sheet 12 at the irradiated zone. Such angularity also causes deflection of the rays constituting the beam 19 reflected from the mirror 17. However, due to the presence of the light-diffusing screen 25, the effect of a beam deflection on the cell 28 is insignificant in comparison with its effect on cell 24. This characteristic is enhanced by making the light opening 27 in screen 26 larger than the light opening 21 in screen 20.

It will be clear that many modifications can be made to the illustrated system. For example, the optical system could be modified so that the lens 15 is behind rather than in front of the semi-transparent mirror 17. The semi-transparent mirror 17 could be arranged so that the axis of reflected beam 19 is at some angle other than 90° to the optical axis 9. As a further example of modifications, the opaque disc 8 may be replaced by a light-transmitting disc, such as a grey disc, which transmits light having a different characteristic, e.g., a lower intensity, than the light which passes around the disc. In such a case the sensitivity of the device to beam deflections will be slightly less since the change in light flux on cell 24, for a given deflection, will be smaller. However, a reduction of sensitivity is not inevitable when transmitting two light beams instead of one light beam and one black or shadow "beam," since the cell 24 could be made sensitive only to light constituting one of the two light beams.

A system of the type illustrated capable of measuring angularities down to 1/3600° can be so designed that it does not exceed 2 meters in length, measured along the optical axis of the system.

Figure 2A:
FIG. 2a shows a modified form of one element of the device of FIG. 1.
Figure 2B:
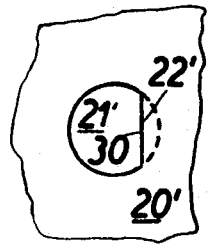
Figure 3A:
Figure 3B:
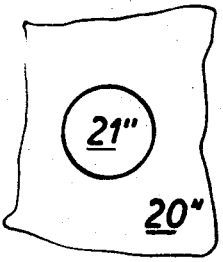
FIG. 3b shows another modified form of the element of FIG. 2b.

FIGS. 2a and 3a show modified shapes for the light mask, while FIGS. 2b and 3b show respective modified shapes for the corresponding light opening in the measuring cell screen.

The mask 8' in FIG. 2a is shown in solid lines to have a semi-circular shape. Actually the relevant feature of this mask is its vertical boundary 31 which bisects the light beam (shown by a broken line) from source 1. It will be apparent that a system wherein the light from the light source is partly cut off in this way will be particularly sensitive to angularities which deflect the light in a direction normal to the beam boundary 31. This sensitivity is enhanced in the illustrated example by utilizing the mask 8' in combination with the screen 20' of FIG. 2b. This screen has a nearly circular opening 21' which is partly obturated by a segment 22' providing a straight chordal boundary 30 parallel to the boundary 31 of the mask 8'. The opaque segment 22' is smaller than a half circle, and is preferably arranged to be on the opposite side of the beam axis with respect to the image of the opaque screen 8', which image is formed on screen 20'. By rotating a mask such as mask 8' (and a segment such as segment 22', if provided) through an angle of 90° or 180° or any other angle, the angularities of the irradiated zone in two or more directions can be registered or recorded without turning the sheet 12 itself.

The mask 8'' in FIG. 3a has the shape of a 90° sector or quadrant and the opening 21'' in the corresponding screen 20'' of FIG. 3b is circular. In this case the system will be particularly sensitive to angularities which deflect the light rays in directions perpendicular to the boundary edges 32 and 33 of the mask 8'' and the system can be designed to register or record the sum of the angularities in these two directions. The sensitivity of the system could be modified by partly obturating the opening 21''. In the event that a mask as shown in FIG. 2a or 3a is replaced by a light filter, e.g., a colored or Polaroid filter, the light opening in the corresponding measuring cell screen can be defined, or covered, or partly covered by an appropriate colored or Polaroid filter.

The "sheet material" tested according to the invention need not be of large size. For example, certain optical lenses and other articles of comparable size can readily be tested.

It may thus be seen that the present invention presents several important advantages over the prior art. Even the best of the prior art methods did not enable the effects of angularity to be isolated from effects which depend solely on the angular orientation of the sheet with respect to the axis of an incident light beam. The ability to create such an isolation is particularly important in the case of certain types of transparent sheets, such as vehicle windshields for example, which are intentionally curved. If it were attempted to utilize the prior art methods for testing such sheets, it would be necessary to carefully position the sheet for each test so that the region traversed by the light beam is at a predetermined angle, preferably of 90°, with respect to the beam axis. It will be appreciated that this is a virtually impossible task when it is desired to determine the angularity at different locations on the curved sheet. If, in the performance of such prior art method, the sheet is not properly positioned, its curvature will be detected and recorded as a defect even though the surfaces of the sheet may be perfectly parallel, i.e., have no angularity. The present invention eliminates this defect by preventing either the curvature or the angular orientation of the sheet being tested from having any influence on the quantity of light reaching the photocells.

In constructing arrangements for carrying out the present invention, no difficulty is encountered in disposing the detector 24 in such a way that lateral displacements of the emergent beam axis, relative to the incident beam axis, unaccompanied by any relative angular deflection, will have no effect on the detector output.

It may be appreciated that when such a purely lateral displacement occurs, the axis of the emergent beam will be displaced from that of the incident beam by an unvarying distance along the entire emergent beam axis so long as there is no angular deflection between the two beams. However, when such an angular deflection does exist, the distance between a projection of the axis of the incident beam and the axis of the emergent beam will increase progressively in a direction from sheet 12 to screen 20. As a result, it is a simple matter to position screen 20 and detector 24 so that the center of area 22 and of the light receiving surface of the detector, are displaced from the projection of the axis of the incident beam by such an amount that only a beam which is angularly deflected, or which is angularly deflected by more than a predetermined amount, will impinge to a greater or lesser degree on the detector.

In designing systems for carrying out the present invention, the detector must be positioned so that its location bears a particular relation to the path which would be followed by the light beam if no test sheet were present, or if the sheet portion under test possessed no angularity. In accordance with the present invention, the system may be provided with one or more beam deflecting devices, such as the lens 15 for example, disposed between the test sheet and the light detector, the lens, or lenses being provided for converging the beam toward the optical axis of the system, or at least for condensing the beam, so as to permit a more compact system to be constructed.

It is also possible, in accordance with the present invention, to dispose one or more light baffles between the test sheet and the detector in such a position that light is reflected away from the detector when no sheet is present or when the test portion of the sheet possesses no angularity, while the emergent light beam will be deflected by a sufficient amount to at least partially by-pass the baffles when the light passes through a sheet in a region in which the sheet possesses some degree of angularity.

It may thus be seen that the present invention can be carried out either by permitting light to reach the detector only when the sheet portion under test possesses angularity or more than a given amount of angularity, or so that a light flux continuously impinges on the detector with an amplitude which varies in proportion to the angularity of the test sheet. It is also possible, and this constitutes the case of the preferred embodiment of the present invention, to arrange the system so that the amplitude of the light flux impinging on the detector varies inversely with the angularity of the sheet test portion.

As is illustrated in the drawings, it is preferable to project a converging light beam toward the sheet to be tested and to locate the sheet so that it is on or adjacent the point of convergence of the beam, the sheet preferably being positioned just ahead of this point, This arrangement assures that only a small region of the sheet will be traversed by the light beam, thus enabling the angularity of a small portion of the sheet to be determined. It should be mentioned that such a result can not be obtained by any of the comparable prior art methods. If the entire sheet, or several portions thereof, is to be tested by the method of the present invention, it is only necessary to move the sheet continuously or periodically and to obtain either a continuous record or successive records.

In order to give a system according to the present invention a high level of sensitivity, it is preferable that the light beam to be projected through the test sheet have at least one well-defined lateral boundary, and to arrange the detector so that when the test sheet possesses angularity in the region traversed by the beam, such well-defined beam boundary will at least partially intersect the exposed light receiving surface of the detector, the position of the boundary with respect to this surface depending on the degree of angularity of the sheet test portion. In the illustrated embodiment, a beam of light emanating from point source 1 is projected past a boundary defined by the edge of mask 8 and through a pair of lenses and the material under test, the lenses causing a sharp image of the mask 8 to be formed in the plane of screen 20.

As a general rule, the detector arrangement will be most sensitive to angular deflections in a direction normal to the boundary defined by the mask. In the case of the arrangement of FIG. 1, since the mask 8 is circular and the opening 21 is annular, the detector will be equally sensitive to deflections in all directions. However, such is not the case when the modified elements of FIGS. 2 and 3 are employed.

Since, in the illustrated embodiment, the mask 8 is located in the focal plane of the first lens 6, the angle of curvature of the test sheet 12 will have substantially no influence on the position of the image of mask 8 at the plane of screen 20.

In the illustrated embodiment, the optical system is designed so that the image of mask 8 falls entirely on a central area 22 of the screen 20 if the light beam is not angularly deflected when passing through the sheet 12. On the other hand, for increasing angular deflections, an increasingly greater portion of the image of mask 8 falls onto the annular opening 21.

Although mask 8 is shown in FIG. 1 to have the same shape as screen area 22, such an identity is not essential, as is indicated by FIGS. 2 and 3.

The lens system according to the present invention is preferably arranged so that it forms a sharp, or focussed, image of the mask or filter on the screen. This makes for greater sensitivity of the measurement, but it is not essential. If, in general, an opaque mask is located in the path of a portion of the light rays from the light source, and if the lens system forms a sharp image of this mask, then the boundary focussed at the site of the detector will define a sharp separation between light and shadow. This is favorable for obtaining high sensitivity because it causes a small angular displacement of the boundary image to produce a comparatively large change in the light flux on the detector.

However, it is possible to dispose, in the path of some of the light rays from the light source, a mask or filter which passes only some of the rays incident thereon, e.g., rays of a single particular frequency, or wavelength, or of a particular wavelength or frequency band. For example, a color or polarization filter may be used. In that case, two light beams of different characteristics, e.g., different colors, will traverse the sheet material under test and the beam boundary above referred to will be a boundary between these beams. In such cases, if a sensitivity as high as that obtainable with an opaque mask is required, then the detector will have to be made insensitive, or relatively insensitive, to light of the type constituting one of the two beams. This may be achieved, for example, by disposing a color or polarization filter in front of the measuring detector. The two beams may have similar or dissimilar cross sections. They may be homothetic or not, or disposed symmetrically or asymmetrically with respect to their common axis or with respect to a plane perpendicular to their cross sections. As one example of the latter arrangement, each of the beams may have a semi-circular cross section and may be disposed to form a composite beam having a circular cross section. It is preferable for each of the two beams to have a different luminous intensity. This favors ease of adjustment.

It has been found to be very suitable to embody the above-mentioned preferred feature, as is shown in FIG. 1, by locating a disc-shaped mask or filter between the light source and the first lens encountered by the light, this disc being in the focal plane of such first lens, and to provide on the far side of the sheet under test a lens or lens system which, in the absence of angular ray deflection, forms an image (preferably a sharp image) of the disc on a screen area surrounded by an annular opening through which light in the part of the beam unobstructed by the disc has access to a photocell. In this case, angular beam deflection in any direction equally influences the detector.

The system can also be arranged to record maximum angularity (whatever its direction) of the test portion of the sheet, or to record the direction (not known in advance) in which the angularity of such portion is maximum. Inasmuch as the disc 8 is in the focal plane of the first lens 6, purely lateral displacements of the beam, occasioned, for example, by an inclination or curvature of the sheet relative to the axis of the system, have little or no effect on the position of the disc image so that the screen area 22 can have the same diameter, or substantially the same diameter, as the image of disc 8 thereon, in which case the slightest angular beam deflection will be registered or recorded. If mask 8 is opaque, any such deflection will result in an appreciable reduction in the light flux impinging upon the photocell 24.

In accordance with another feature of the present invention, and as has been described above in connection with FIG. 1, it is not necessary for all of the light passing through the test sheet to be transmitted to the site of the detector 24. A portion of this light can be filtered off or deflected.

For example, as is shown in FIG. 1, the emergent light beam is divided by a beam-splitting device, here constituted by a semi-transparent mirror 17, into a beam 18 which influences detector 24 and a beam 19 which impinges on a light diffusion screen 25 disposed ahead of a second light detector 28. Because the screen 25 serves to diffuse the light beam, the light flux received by detector 28 will remain at a substantially constant level over a wide range of angular deflections of the emergent beam 16.

Mirror 17 is preferably, but not necessarily, constructed so as to effect an equal division of beam 16 into the two beams 18 and 19. The second light detector 28 is provided in order to yield an indication of variations in the intensity of beam 16 due to variations in the intensity of the light emitted by source 1 or due to changes in sheet transparency from one sheet location to another, or from one sheet to another. It will be appreciated that these intensity variations will cause the output from detector 24 to vary in the same manner as angular deflections of beam 16. Therefore, the provision of a second detector 28 whose output varies in the same manner as the output of detector 24 only in response to intensity variations not created by an angular beam deflection permits these extraneous intensity variations to be compensated in a suitable detector circuit. Alternatively, the second detector 28 can be electrically connected to the light source for varying its light output in such a manner as to maintain the average intensity of beam 16 constant.

It has been found that the provision of this second, or reference, detector, is highly advantageous because it enables very accurate results to be achieved when there were present influences which would affect the accuracy of the results obtainable if only a single measuring detector were used. Such disturbing influences, which are of the type mentioned above, while not preventing a qualitative determination of the presence of angularity, would obviously prevent accurate quantitative indications from being obtained unless such a reference detector were employed. More specifically, it has been found that when a reference detector is used in carrying out the method of the present invention, the accuracy of the results obtainable are far superior to those of which the prior art methods are capable. For example, as has also been mentioned above, the illustrated embodiment of the present invention, when using two detectors, can consistently obtain accurate measurements of angularities as small as 1/3600th of a degree.

It is preferable for the detector system, which includes the two detectors 24 and 28 and the detector circuit 34, to be arranged to compensate for any variation in light intensity or composition, whether this variation be caused by variation in sheet color, sheet thickness, sheet cleanliness, etc.

It will be understood that if the light projected through the sheet under test forms two beams of different characteristics as hereinbefore referred to, so that the light emergent from the sheet forms in effect a composite beam, then the beam splitting device must be such that a constant proportion of each of such component beams is directed to each of the detectors.

The reference detector must be arranged so that in contrast to the other detector, the total light flux incident thereon will not be significantly modified by angular beam deflections, such as are caused by angularity, which are intended to vary the output of the measuring detector. For this purpose, the detectors may have different characteristics and/or a device for modifying the properties of the light signals to the detectors may be associated with one or each of them.

As a further alternative, the necessary differential response may be ensured by appropriate location of the individual detectors in relation to the paths of the light rays to which they are exposed. For example, the reference detector may be of similar sensitivity to the measuring detector but disposed at such a distance from the beam splitting device that the light flux on the detector is not affected by the ray deflections. As a further specific example, and as illustrated in FIG. 1, a light-diffusing screen 25 may be placed in front of the reference detector so that the light flux on the reference detector is not materially affected by variations in the distribution of the light incident upon the screen.

Alternatively, or additionally, the area of the reference detector exposed to the influence of light from the beam splitting device may be appreciably larger than the exposed area of the measuring detector so that the proportional change in light flux on the reference detector for a given angular beam deflection is negligible in comparison with the proportional change in light flux on the measuring detector.

A test sheet may possess angularity in any direction along the sheet. In other words, it is not possible to completely describe the angularity of a sheet at any given location unless the direction along the sheet in which the angularity is measured is stated. Assuming that the surfaces of the sheet in the given test location are plane surfaces converging in one direction towards an imaginary line of intersection, the maximum angularity, also called the "maximum slope angle," is the angularity in a plane perpendicular to the surfaces and to such line of intersection. The angularity of the surfaces measured in a direction parallel with such line will be zero, and the angularities in the intermediate directions will have intermediate values. If the present invention is carried out with the detector placed so that it responds to the angular deflection of a beam in only one direction relative to the beam axis, then the method will only detect or measure angularity in one direction along the sheet, unless the sheet itself is turned relative to the beam of light. If it is so turned, the angularity in two or more directions along the sheet at a given location can be detected or measured. The angularities in two or more directions can be detected or measured without turning the sheet if the beam deflection detector device is arranged so as to respond to an angular beam deflection in two or more directions relative to the axis of the system, as was described above in connection with FIGS. 2 and 3.

Apparatus according to the invention preferably includes a light detector serving as a measuring light detector, a reference light detector, and means for directing part of the light emerging from a sheet under test, to the reference detector, the latter being coupled, or being capable of being coupled, into the system so as to compensate for variations in the intensity of the light from the light source or in the transparency of a sheet under test.

A preferred form of apparatus according to the invention includes a point light source, and means including a system of lenses or other optical elements for optically projecting a light beam through a sheet mounted on the sheet holder so that at least one beam boundary which becomes displaced in dependence on sheet angularity is sharply focussed at the site of the ray deflection detector device. Preferably a mask or filter, such as the opaque disc hereinbefore described, is provided between the point light source and a first lens, and in the focal plane of such lens, so that the boundary or boundaries of such mask or filter is sharply focussed at the site of the ray deflection detector.

Apparatus according to the invention may also include a continuous recording system providing a record of angularity as a function of sheet displacement so that the extent of angularity from location to location on a sheet along a given line or lines extending in one or several directions along the sheet, can be recorded, any well-known means being provided for displacing the sheet holder and synchronizing its displacements with the record of angularity. The record may be a photographic, magnetic or other record. Thus records can be produced on documents or other elements such as quadrille paper, photographic sheets, film, or magnetic tape. Angularity can be recorded along any selected line or band extending in any selected direction along or across a sheet, each point at which the angularity is recorded being identified in terms of sheet coordinates. Alternatively, angularity may be recorded as a function of the direction or directions of the lines or bands along which the angularity is measured. A continuous record made during continuous sheet displacement reveals the extent of angularity from point to point and thus the powers of the rates of variation of the angularities. In refined systems, the angularities in all directions at any selected point or points or at all points can be recorded, for example, using ray beam masks or filters which can be displaced during testing of a sheet at any point as described above. It will also be apparent that the thickness of a sheet at any given point can be determined from a record of angularity values.

It will be understood that the above description of the present invention is susceptible to various modifications, changes, and adaptations.

I claim:

1. In an arrangement for measuring the angularity between two opposed faces of a transparent sheet at any point on the sheet, which sheet has any arbitrary curvature, including, in combination;
   a. a light source for emitting at least one beam of light and for directing said beam along a path toward the point of such sheet which is to be tested;
   b. a first lens disposed in the path of said beam between said light source and such sheet for converging said beam towards such sheet;

c. a mask disposed in the focal plane of said first lens between said lens and said light source and having a well-defined boundary;
d. means holding the sheet in the path of the beam beyond said first lens;
e. a screen disposed beyond said sheet and provided with an opening having a border;
f. a second lens disposed in the path of said beam between the point of convergence of said beam and said screen for focusing an image of said mask onto said screen so that the focused image of part of but less than the entire boundary of said mask passes through said opening when the beam is angularly undeflected during passage through the sheet; and
g. means optically communicating with said screen and including a light sensitive surface for optically detecting changes in the position of said mask image on said screen caused by an angularity of said sheet in the region thereof through which said beam passes;
h. whereby such image is displaced transversely to the initial path of said beam only when such angularity exists;
the improvement wherein said boundary of said mask and said border of said opening have relative configurations, and said border is positioned relative to the image of the boundary in the plane of said opening, so that when the mask image is angularly undeflected at least a portion of the mask boundary extends across said opening, and a deflection of the mask image in one direction along a line normal to the beam axis increases the proportion of the beam passing through said opening and striking said light sensitive surface and a deflection of the mask image in the opposite direction along that line reduces the proportion of the beam passing through said opening and striking said light sensitive surface, whereby the output of said detecting means varies in magnitude in proportion to the degree of mask image angular deflection and in direction as a function of the direction of the mask image deflection along such line.

2. An arrangement as defined in claim 1 wherein said means for detecting is disposed behind said screen for detecting changes in the amount of light traversing said opening, said arrangement further comprising a reference light detector having a light sensitive surface, diverter means for diverting a portion of said beam, after it has been transmitted through such sheet, onto said sensitive surface of said reference detector, said reference detector being arranged to be insensitive to transverse displacement of said mask image, and means connected to the output of said reference detector and said means for detecting for rendering the indications produced by said means for detecting insensitive to variations in the intensity of said beam not caused by angular deflections thereof.

3. An arrangement as defined in claim 1 wherein said mask image is focused at the site of said means for detecting.

4. An arrangement as defined in claim 3 wherein said mask is made of an opaque material.

5. An arrangement as defined in claim 1 wherein said sheet holding means is arranged for moving a sheet mounted thereon in a lateral direction, said arrangement further comprising means for recording angular deflections of said light beam as a function of the displacement of such sheet.

6. An arrangement for measuring the angularity between two opposed faces of a transparent sheet at any point on the sheet, which sheet has any arbitrary curvature comprising, in combination:
a. a light source for emitting at least one beam of light and for directing said beam toward the point of such sheet which is to be tested;
b. a first lens disposed in the path of said beam between said light source and such sheet for converging said beam toward such sheet;
c. a mask of a transparent material which imparts at least one optically detectable characteristic to the light passing therethrough, said mask being disposed in the focal plane of said first lens between said first lens and said light source so that one portion of said beam passes through said mask and another portion of said beam traverses the focal plane of said first lens outside of the area enclosed by said mask, whereby a portion of said beam passing through said mask is caused, by its passage through said mask, to differ in at least one optically detectable characteristic from the portion of said beam passing outside of the area enclosed by said mask;
d. means holding the sheet in the path between the beam beyond said first lens;
e. a screen disposed beyond the sheet;
f. a second lens disposed in the path of said beam between the point of convergence of said beam and said screen for focusing an image of said mask onto said screen; and
g. means optically communicating with said screen and including a light sensitive surface having a defined sensing area for optically detecting changes in the position of said mask image on said screen caused by an angularity of the sheet in the region thereof through which said beam passes;
h. whereby such image is displaced transversely to the initial path of said beam only when such angularity exists; and
j. wherein the mask and the light sensitive surface sensing area have relative configurations, and the sensing area is positioned relative to the image of the mask in the plane of the screen, so that when the mask image is angularly undeflected at least a portion of the lateral boundary of that image extends across the sensing area, and a deflection of the mask image in one direction along a line normal to the beam axis increases the proportion of the mask image striking the light sensitive surface sensing area and a deflection of the mask image in the opposite direction along that line reduces the proportion of the mask image striking the light sensitive surface sensing area, whereby the detecting means provides an output which varies in magnitude in proportion to the degree of mask image angular deflection and in direction as a function of the direction of the mask image deflection along such line.

7. An arrangement as defined in claim 6 wherein said mask and said sensing area have respectively different configurations and at least one of these configurations is radially asymmetric about the beam axis with respect to a plane containing that axis.

8. An arrangement as defined in claim 7 wherein it is the mask which is asymmetric.

9. An arrangement for measuring the angularity between two opposed faces of a transparent sheet at any point on the sheet, which sheet has any arbitrary curvature, comprising, in combination:
   a. a light source for emitting at least one beam of light and for directing said beam along a path toward the point of such sheet which is to be tested;
   b. a first lens disposed in the path of said beam between said light source and such sheet for converging said beam towards such sheet;
   c. a mask disposed in the focal plane of said first lens between said lens and said light source and having a well-defined boundary;
   d. means holding the sheet in the path of the beam beyond said first lens;
   e. a screen disposed beyond said sheet and provided with an opening;
   f. a second lens disposed in the path of said beam between the point of convergence of said beam and said screen for focusing an image of said mask onto said screen so that the focused image of at least a portion of said mask passes through said opening when the beam is angularly undeflected during passage through the sheet;
   g. means optically communicating with said screen and including a light sensitive surface for optically detecting changes in the position of said mask image on said screen caused by an angularity of said sheet in the region thereof through which said beam passes whereby such image is displaced transversely to the initial path of said beam only when such angularity exists; said means for detecting being disposed behind said screen for detecting changes in the amount of light traversing said opening;
   h. a reference light detector having a light sensitive surface;
   j. diverter means for diverting a portion of said beam, after it has been transmitted through such sheet, onto said sensitive surface of said reference detector, said reference detector being arranged to be insensitive to transverse displacement of said mask image; and
   k. means connected to the output of said reference detector and said means for detecting for rendering the indications produced by said means for detecting insensitive to variations in the intensity of said beam not caused by angular deflections thereof.

10. An arrangement as defined in claim 9 wherein said diverter means divert a portion of said beam which is independent of any angular deflection experienced by said beam; and said means for rendering insensitive comprise means for comparing the output indication from said reference detector with the output indication from said means for detecting for modifying the indication from said means for detecting as a function of variations in the indication from said reference detector.

11. An arrangement as defined in claim 9 wherein said means for detecting and said reference detector each comprises a photoelectric cell.

12. An arrangement as defined in claim 2 further comprising a bridge circuit and wherein said means for detecting and said reference detector are each electrically connected in a respective arm of said bridge circuit.

13. An arrangement as defined in claim 12 wherein said bridge circuit further includes a microammeter connected to indicate current variations in the output of said means for detecting due to angular deflections of said beam.

14. An arrangement as defined in claim 12 wherein said bridge circuit further comprises a resistance connected so that the voltage thereacross varies in response to variations in the output of said means for detecting due to angular deflections of said beam, and voltage measuring means for measuring the voltage drop across said resistance.

* * * * *

UNITED STATES PATENT OFFICE
CERTIFICATE OF CORRECTION

Patent No. 3,688,235          Dated August 29th, 1972

Inventor(s) Paul Migeotte

It is certified that error appears in the above-identified patent and that said Letters Patent are hereby corrected as shown below:

In the heading of the patent, line 15, change "Belgium" to --Luxembourg--. Column 4, line 45, after "and" change "36" to --38--. Column 16, line 27, change "claim 2" to --claim 9--.

Signed and sealed this 6th day of March 1973.

(SEAL)
Attest:

EDWARD M. FLETCHER, JR.          ROBERT GOTTSCHALK
Attesting Officer          Commissioner of Patents